Figure 1:
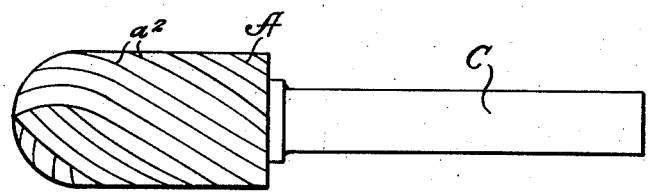

Jan. 7, 1947.  J. L. MOLNER ET AL  2,413,989
ROTARY TOOL
Filed Nov. 2, 1944

John L. Molner and
Anton Campula,
INVENTORS.

BY Hull n West
ATTORNEYS.

Patented Jan. 7, 1947

2,413,989

UNITED STATES PATENT OFFICE 2,413,989

ROTARY TOOL

John L. Molner and Anton Campula, Cleveland, Ohio

Application November 2, 1944, Serial No. 561,616

1 Claim. (Cl. 29—78)

This invention relates to that class of tools known as rotary files or burrs. Tools of this class are used with hand-held electric or pneumatic driving implements, and each tool consists of a head having a toothed or fluted working surface, and a stem or shank that carries the head and is adapted to be clamped in the chuck of the driving implement. In prevailing constructions, the stem or shank is connected to the head, either by being formed integrally therewith or by being welded or otherwise permanently connected thereto, or by being threadedly and, therefore, removably attached to the head. The latter method affords the advantages of replacement in case of bending, cracking or breaking of the stem, or chipping or breaking of the head. A further advantage is that it permits the selection of stems best suited to the kinds of chucks with which they are to be used.

In the beginning, heads of tools of this class were made exclusively of high speed steel, and they still are to a large extent, but regardless of the high quality of steel used, the tools soon became dull or chipped and required frequent grinding or reconditioning. This operation is not only expensive and keeps the tool out of service for considerable time, but often results in the tool being thrown out of balance.

To overcome the above mentioned and other obvious disadvantages attending the use of steel for the heads of rotary files or burrs, rather recently an extremely hard material, specifically a sintered refractory metal, has been substituted for high speed steel. Examples of such a material are cemented carbide, tungsten carbide, or alloys of a similar nature, and a tool head made of this material, according to conservative estimation, lasts at least fifty times longer than one made of high speed steel, and requires sharpening or reconditioning at proportionately less frequent intervals. Also, because of the hardness of the material, less is removed in the average sharpening operation, for which reason the tool head is not so liable to be perceptibly thrown out of balance. It must be said, however, to its disadvantage, that this material is several times as heavy as high speed steel.

Furthermore, this sintered refractory metal, after final heat treatment, is so hard that it is unworkable to the degree necessary to bore and tap the head for the reception of the threaded end of a shank. As a consequence, the usual steel shank has to be welded or similarly attached to the head, and the resultant heating and subsequent cooling of the two metals of different coefficient of expansion set up enduring internal strains or stresses that contribute to ultimate cracking or breaking in the region of the joint when the tool is subjected to the customary lateral pressures that occur when the tool is in use. It may be explained, also, that it is impractical, if not impossible, to satisfactorily thread the material while in a relatively soft condition after a preliminary heat treatment as it ends to break down or crumble when bored and tapped.

Because of lateral pressure imposed upon the tool when in use, it is not uncommon for the stems to become bent, throwing the tool out of balance from this cause, and due to the extreme weight of the head, when made from the above described material, a whipping action occurs that either greatly interferes with the operation of the tool, or renders the tool useless altogether. It may be added that even the slightest unbalanced condition of the tool, or eccentricity of the mass of the head with respect to the axis of the stem, causes minute continuous vibration when the tool is in use that results in premature fatigue or crystallization of the metal of either or both the head and stem with resultant cracking or breaking.

It is a fundamental purpose of our invention to combine in a tool of the class referred to the advantages of both the high speed steel head and the sintered refractory metal head, and to preclude the undesirable features of both, thereby to provide a tool that is extremely durable; that is comparatively light of weight; that is relatively inexpensive; that is well balanced; that is adapted to have the stem detachably or threadedly connected to the head, and wherein there is a shock absorbing element between the head and stem.

Further and more specific objects and additional advantages will appear as we proceed to describe the invention by reference to the accompanying drawing wherein like characters designate corresponding parts throughout the several views.

Figure 2:
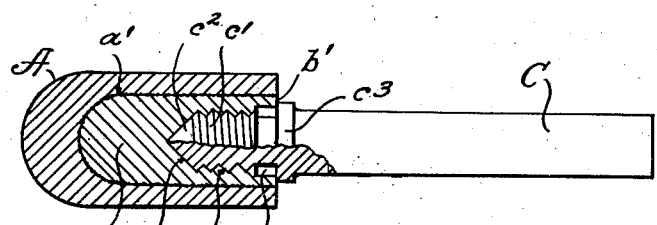
Figure 3:
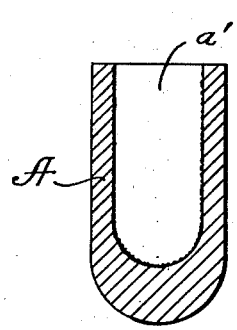
Figure 4:
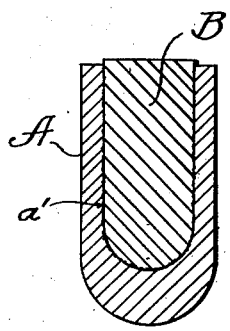
Figure 5:
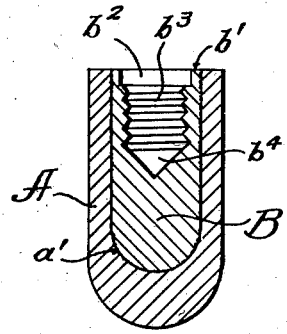

In the drawing, Fig. 1 is a side elevational view of a rotary tool or burr constructed in accordance with our invention; Fig. 2 is a similar view with the head shown in central longitudinal section and a part of the stem adjacent the head broken away to better disclose the nature of the connection between the stem and head; Fig. 3 is a central section through the shell of sintered refractory material that forms the exterior portion of the head; Fig. 4 shows said shell filled with a core of metal that is readily susceptible to machine operations, and Fig. 5 is a view, similar to Fig. 4, showing the core finished on its exposed end, drilled and tapped.

As is well known, the heads of tools of the class to which the invention pertains are made in various sizes and shapes, and for the purpose of the present disclosure selection has been made of a popular style known as the ball nose cylindrical head.

The tool of our invention comprises the following general parts: a shell A of extremely hard, dense and, incidentally, heavy material or metal alloy, preferably sintered refractory metal, the cavity of which is designated $a'$, said shell being formed on its exterior with the usual flutes or teeth, such being conventionally illustrated and designated $a^2$ in Fig. 1; a core B of suitable, readily workable metal of high ductility, such as steel of appropriate quality, bronze, or a welding or brazing metal, and a shank C, preferably of steel. The core adjacent the open end of the shell A is desirably finished flush with said end in a plane normal to the axis of the head, the exposed end or face of the core being designated $b'$. The core is provided with an axial socket $b^2$ that opens through said end or face and is threaded, at least for a part of its length, as indicated at $b^3$. The inner end of the recess is desirably conical and symmetrical with respect to the axis of the head to provide a guide wall $b^4$ for a purpose that will presently appear.

The stem or shank C terminates at its inner end in a threaded boss $c'$ the extremity of which is conical to provide a pilot designated $c^2$ that is precisely complementary to the guide wall $b^4$, the cooperation of said pilot with said wall insuring absolute alignment of the head and stem, notwithstanding the slight looseness in the threaded connection between them, required for practical purposes. The stem is shown as provided also with a flange $c^3$ between its body portion and the boss $c'$ and the radial face of said flange adjacent the latter is in a plane normal to the axis of the stem and is arranged to bear against the end of face $b'$ of the core B. It is desirable that the radius of the flange $c^3$ be less than that of the core so that the flange does not contact the shell A. The coaction of the flange and said end or face of the core also contributes to precise axial alignment of the stem and head, and without much sacrifice of precision either the flange $c^3$ or the pilot $c^2$ may be dispensed with in order to facilitate production inasmuch as extreme accuracy has to be observed if both are to function simultaneously for the purpose mentioned.

In the present preferred method of producing the head, we start with a body of the material from which the shell A is to be made while said material, composed of powdered ingredients, such, for example, as tungsten, carbide, and a suitable binder, is in plastic condition, and we mold or shape and size said body to correspond to the external size and shape of the finished head. This body is then given a preliminary heat treatment which reduces the material to a consistency approximating that of graphite.

After said heat treatment, the cavity $a'$ is bored. In the boring of the body to produce said cavity, the material, which, in its present state, is slightly friable, has a tendency to crumble, leaving a rather rough surface on the interior of the shell, and this is advantageous for our purpose, as will hereinafter appear. The shell is then subjected to a final heat treating or sintering operation which renders the material exceedingly hard.

The core B, of a workable metal such as that above described, is emplaced within the shell and bonded thereto in such manner that the core and shell are firmly locked together, the structure being represented in this condition in Fig. 4. This step of the method, including the bonding of the core to the shell, may be executed in various ways. For example, the core may be preformed and then emplaced within and secured to the shell by welding or brazing in the usual manner, or the bonding may be accomplished by disposing the welding or brazing material between the external surface of the core and the internal surface of the shell and subjecting the assembly to a sufficiently high temperature to melt said material; or a suitable metal, such as bronze, or a welding or brazing metal, may be melted and poured into the shell and allowed to harden, in which case the core and shell will become interlocked due to the roughened condition of the internal surface of the shell above referred to.

After the core is in place, its exposed end may be ground or otherwise finished flush with the end of the shell and in a plane normal to the axis of the latter, after which the core may be drilled, counterbored if desired, and tapped to provide the threaded recess $b^2$, in which condition the assembly is shown in Fig. 5.

A stem may then be applied to the head and the flutes or teeth $a^2$ cut in the exterior surface of the shell.

Having thus described our invention, what we claim is:

In a rotary tool of the class described, a head comprising a shell of sintered refractory metal, said shell being symmetrical with respect to its rotating axis and open at its rear end, a core of ductile metal of a quality susceptible to machine operations but harder, and of a considerably higher melting point, than lead or a lead alloy, said core occupying the shell and bonded to the interior surface thereof, the rear end of the core being exposed at the rear end of the shell, said rear end of the core having a radial surface that is symmetrical with respect to the rotating axis of the head, the core having an axial threaded recess that opens through the rear end of the core, and a stem having a threaded extension adapted to be received by said recess and a radial shoulder arranged for contact with said radial surface of the core, said radial shoulder being of a lesser radius than the exposed end of the core, the exterior surface of the shell being characterized by cutting parts.

JOHN L. MOLNER.
ANTON CAMPULA.